May 4, 1926. 1,583,580
L. DINESEN
MILKING APPARATUS
Filed June 6, 1921 5 Sheets-Sheet 1
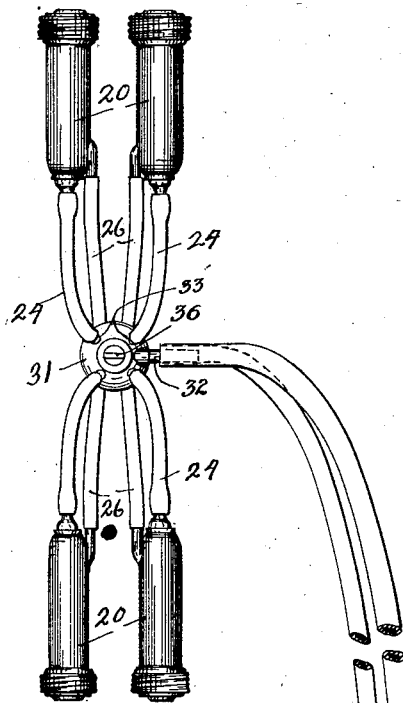
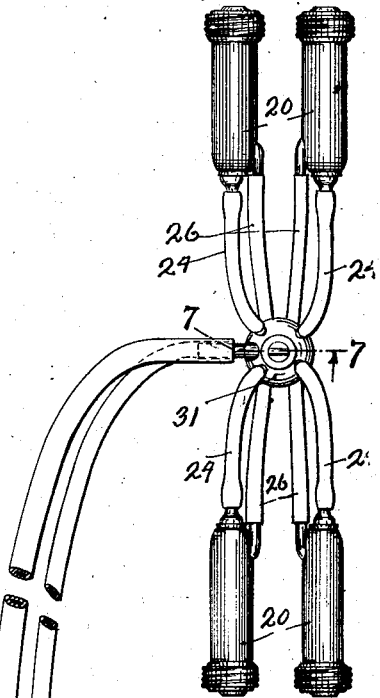
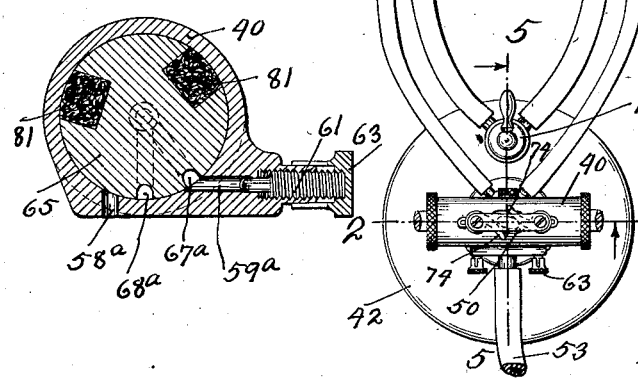
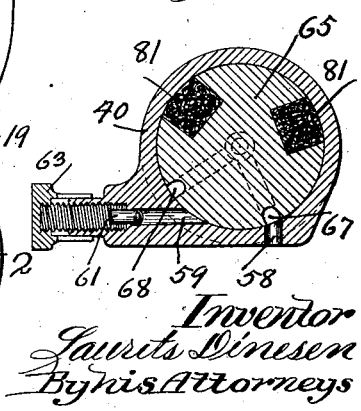
Fig. 1
Fig. 3
Fig. 4
Inventor
Laurits Dinesen
By his Attorneys

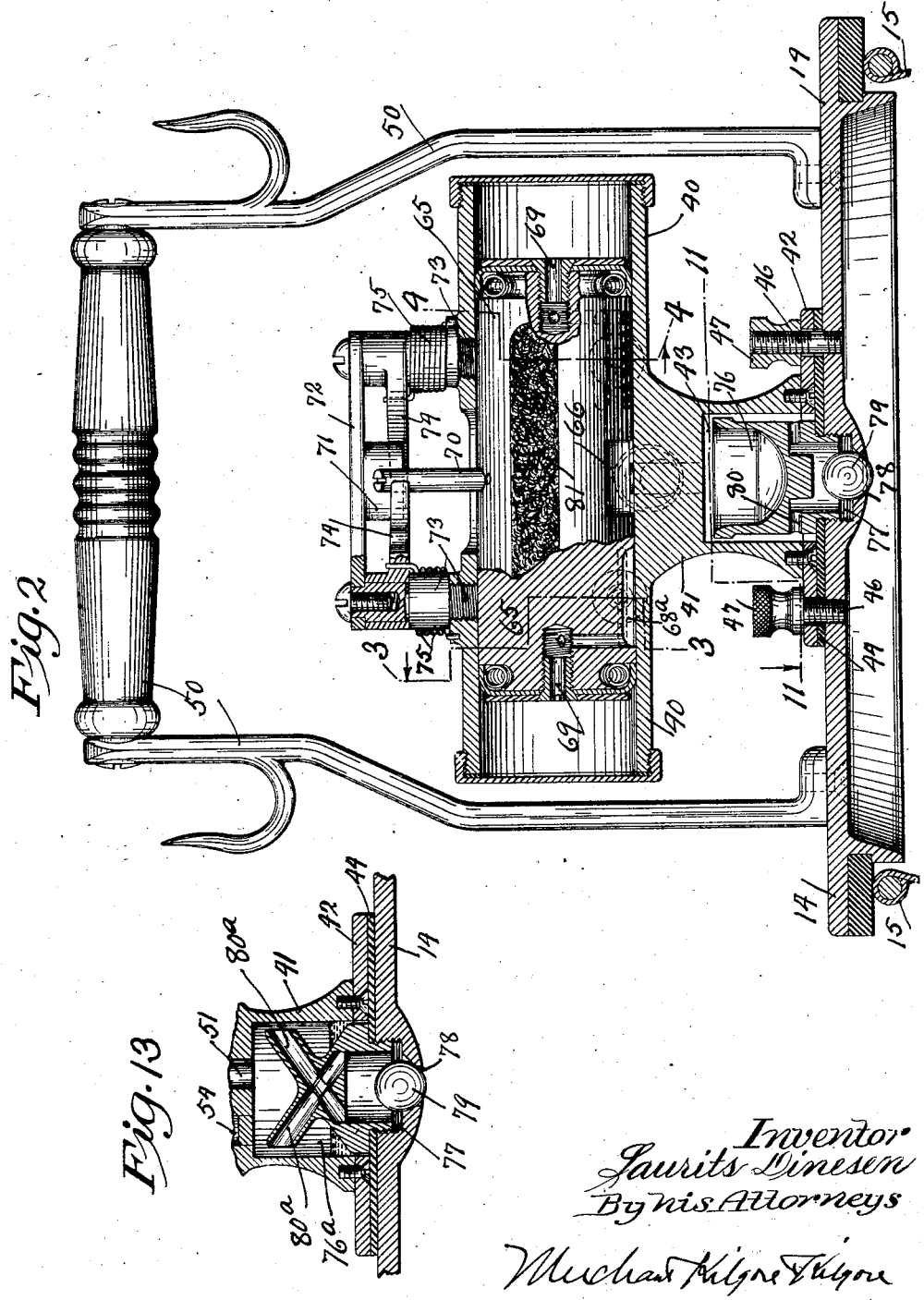

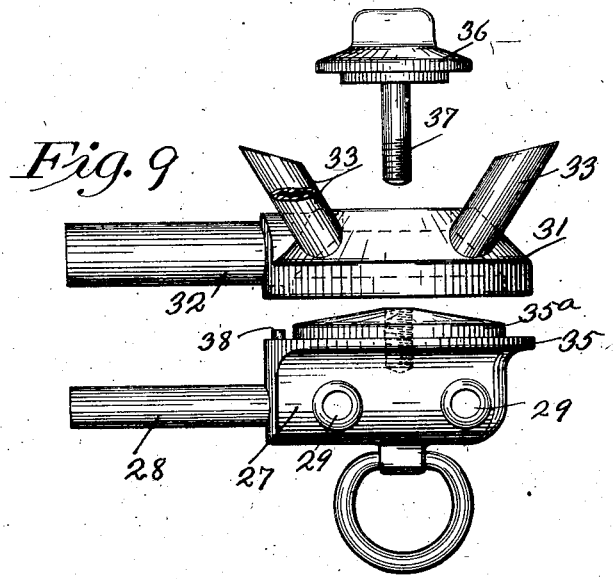
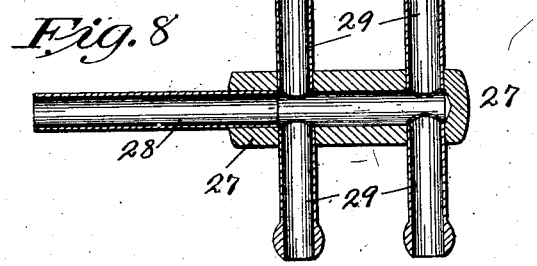
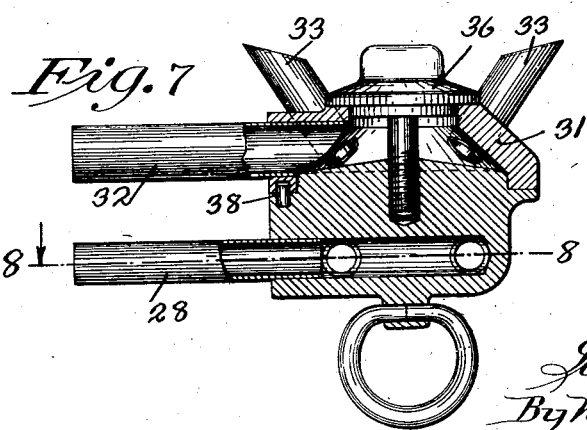

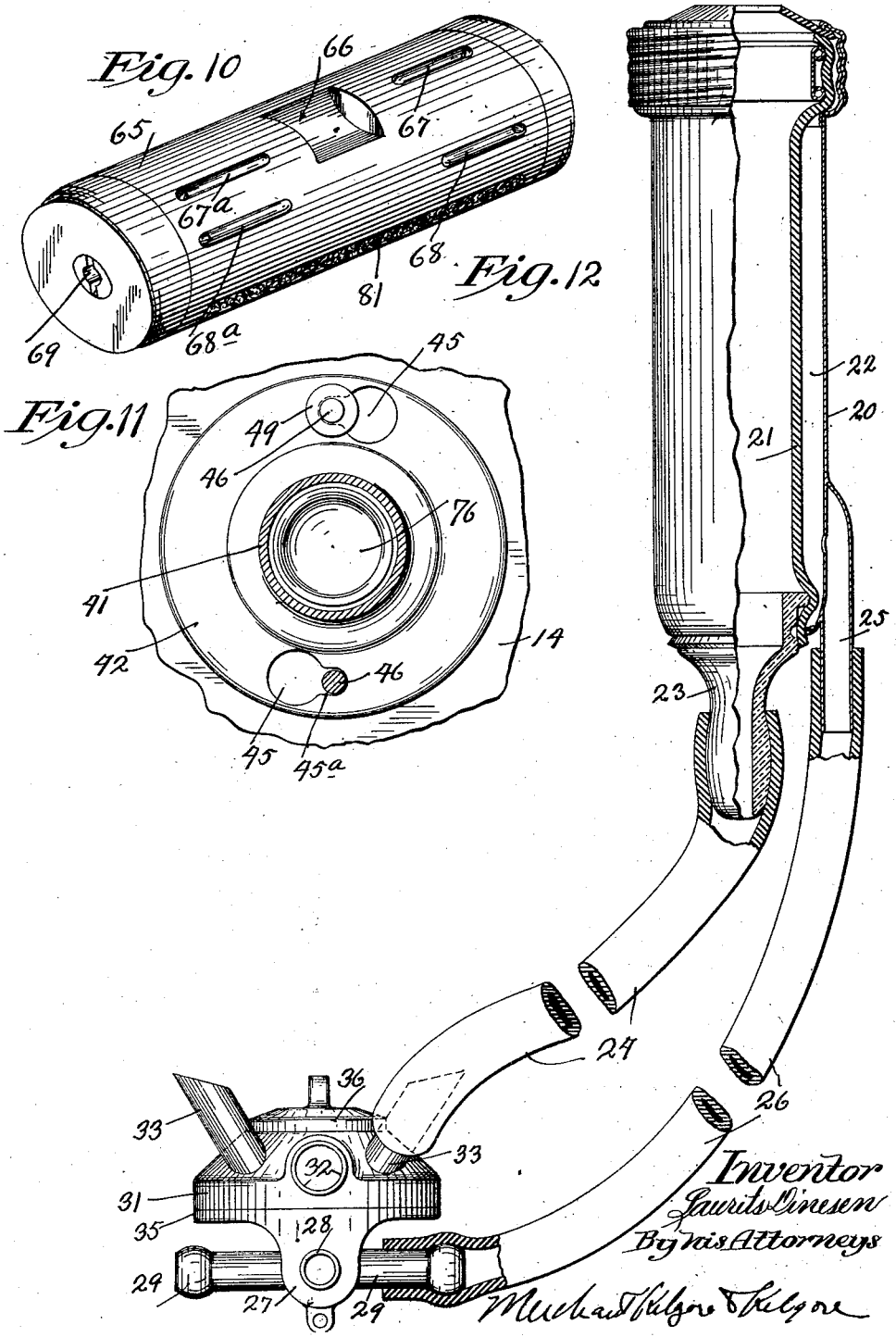

Patented May 4, 1926.

1,583,580

UNITED STATES PATENT OFFICE.

LAURITS DINESEN, OF MINNEAPOLIS, MINNESOTA.

MILKING APPARATUS.

Application filed June 6, 1921. Serial No. 475,229.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My present invention relates to milking apparatus and is in the nature of an improvement on or refinement of the milking apparatus disclosed and broadly claimed in my prior Patent #1,117,169, of date November 17, 1914.

Generally stated, the invention consists of the novel devices and combinations of devices, hereinafter described and defined in the claims.

The various novel features of the present invention will appear in connection with the description of the accompanying drawings, which illustrate a commercial, operative embodiment of the present invention.

Referring to said drawings, wherein like characters indicate like parts throughout the several views, Fig. 1 is a plan view illustrating the apparatus and showing what may be treated as a one-unit or rather a sort of double-unit apparatus consisting of one milk pail or receptacle, two groups of teat cups and a pulsator on the pail cover having connections to both groups of teat cups;

Fig. 2 is an enlarged vertical section taken approximately on the line 2—2 of Fig. 1, some parts being in full;

Fig. 3 is a section on the line 3—3 of Fig. 2;

Fig. 4 is a section on the line 4—4 of Fig. 2;

Fig. 7 is an enlarged vertical section taken approximately on the line 7—7 of Fig. 1, some parts being shown in full;

Fig. 8 is a horizontal section on the line 8—8 of Fig. 7;

Fig. 9 is a side elevation of the parts illustrated in Fig. 7, but showing the air tube coupler, milk tube coupler and cap drawn apart or separated;

Fig. 10 is a perspective showing the piston of the pulsator;

Fig. 11 is a horizontal section taken approximately on the irregular line 11—11 of Fig. 2;

Fig. 12 is a view partly in elevation and partly in section, showing the construction of one of the teat cups and illustrating its connection to the co-operating air tube coupler and milk tube coupled; and Fig. 13 is a fragmentary section corresponding in the line of its section to Fig. 2, but illustrating a modified form of the oil trap.

Figure 5:
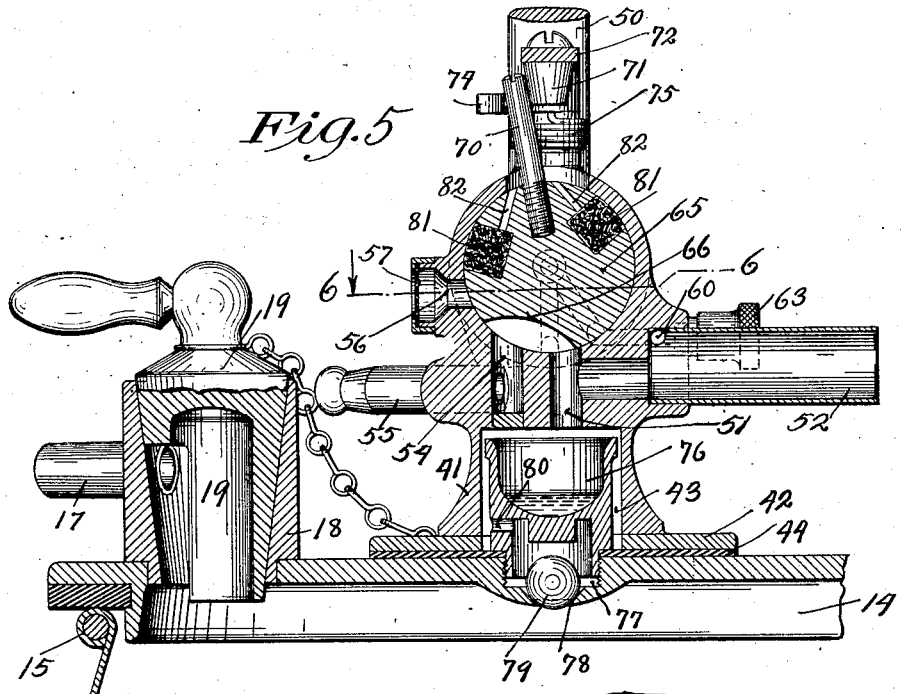
Fig. 5 is an enlarged section taken approximately on the line 5—5 of Fig. 1, some parts being in full.

The pulsator in this preferred arrangement is mounted on the cover 14 that fits a pail or milk receptacle 15 with an air-tight joint. Partial vacuum will be maintained in the pail through connections hereinafter described, and each of the two groups of four teat cups is connected to the pair or receptacle by a milk delivery tube 16. These two milk tubes, as shown, are connected at their delivery ends to nipples 17 projected from a valve casing 18 that is secured on and opens to the cover 14, (see Fig. 5). Working in the valve casing 18 is a valve 19, which is adjustable to open both of the nipples 17 or to close both of the same or to open either one and close the other nipple, at will.

The teat cups employed are of the two-chamber type and, as illustrated, comprise outer metallic shells 20 and flexible tubular inner walls 21, said shell and tube being spaced to form an annular air chamber 22. The central or teat chamber of the cup is provided with a projecting nipple 23, to which flexible branch milk tubes 24 are attached. The outer shells 20 are provided with nipples 25 that lead from the air chambers 22 and to which are attached flexible branch air tubes 26.

As a feature of the present invention, I provide, for each group of four teat cups, a so-called air tube coupler head and a so-called milk tube coupler head. The air tube coupler head 27 is provided with a main air nipple 28 and with four branch air nipples 29. The above noted branch air tubes 26 are applied to the corresponding branch air nipples 29 and are thus coupled to the head 27. For each teat cup group, there is a main air tube or rubber hose 30 that leads from the pulsator presently to be described and is connected to the main nipple 28 of the air tube coupler head 27.

The milk tube coupler head 31 is of substantially annular form, and is provided with a main nipple 32 and with four branch nipples 33. The branch milk tubes 24 are applied to the respective branch nipples 33, while the outer end of the corresponding main milk tube 16 is applied to the main nipple 32.

The milk tube coupler head 31 being, as stated, annular in form, is capable of being easily cleaned when separated from the air tube coupler head 27. To form a bottom for said milk tube coupler head, the air tube coupler head 27 is formed with a disk-like top flange 35 having a raised central portion 35$^a$ that is adapted to be telescoped into the bottom opening of said milk tube coupler head 31.

To close the top of said milk tube coupler head 31, I provide a cap 36 having a threaded stem 37 arranged for threaded engagement with a threaded axial hole in the raised bottom-forming portion 35$^a$ of the air tube coupler head 27. When the stem of the cap 36 is screwed into the head 27, as best shown in Fig. 7, the two coupler heads will be securely clamped together and the annular milk tube coupler head will, of course, be closed at top and bottom. To insure alignment of the nipples 32 and 28, one over the other, the annular head 27 is shown as provided with a dowel pin 38 that engages a seat in the head 31. The head 27 is shown as provided with a ring 39.

The pulsator mechanism, which involves novel features, per se, and in its association with other elements, is preferably mounted directly on the pail cover 14. As illustrated, it comprises a horizontal cylinder 40 provided with a depending intermediate pedestal 41, which, by screws or other means, is rigidly secured to a base plate 42. The pedestal 41 is formed with a large inner chamber 43 that opens through the base plate 42. A pliable packing plate 44, preferably of rubber, is interposed between the base plate 42 and the top of the pail cover 14. At diametrically opposite points, (see Figs. 2 and 11), the base plate 42 is formed with large perforations 45 having contracted extensions 45$^a$. Threaded studs 46 are rigidly secured to the pail cover 14 and are provided with thumb nuts 47. These studs 46 extend through the pliable packing plate 44 and through the perforations 45. When the cylinder structure is turned so that the perforations 45 are aligned with the nuts 47, said cylinder structure may be lifted from position or applied in working position, but when the cylinder structure is turned so that the studs 46 are in the contracted portions 45$^a$ of said perforations, and the nuts are then tightened, the cylinder structure will be securely fastened or anchored in working position on the pail cover.

The numeral 50 indicates a rigid bail-like handle secured to the pail cover 14 and, as shown, embracing the cylinder structure.

The pulsator cylinder 40, (see Figs. 5 and 6), is formed with a central port 51 that leads downward into the base chamber 43 and is connected to a main suction nipple 52, which latter, by a flexible tube 53, is connected to a vacuum tank or other source of partial vacuum or suction. The cylinder base is also provided with a central depending port 54, the lower end of which is plugged but which is in constant communication with laterally projecting air nipples 55, to which the air suction tubes 30 are connected, as best shown in Fig. 1. In the same cross section as the ports 51 and 54 the cylinder 40 is provided with an atmospheric air intake port 56 shown as protected by a screen 57. On opposite sides of the plane of the ports 51, 54 and 56, the cylinder 40 is provided with secondary atmospheric ports 58—58$^a$ and with secondary suction ports 59—59$^a$. The suction or vacuum ports 59—59$^a$ are connected to the main suction nipple 52 or other suitable portion of the main suction conduit, by small conduits 60 that are adapted to be opened or closed, or, in other words, choked off more or less by independently adjustable valves. These valves 61, as shown, are of the needle valve type, have threaded engagement with the interior of sleeves 62 on the cylinder, and, as shown, have knurled heads 63 with split sleeves that frictionally engage the sleeves 62. As shown, the outer ends of the conduits 60 are closed by plugs in the form of short screws 64.

In the present type of pulsator, the piston 65, that works within the cylinder 40, is mounted for reciprocatory and oscillatory movements within said cylinder and is provided, at the intermediate portion of its under side, with a main air port 66 and, on opposite sides of said main air port, with longitudinal secondary air ports 67—68 and 67$^a$—68$^a$. The main port 66 is a blind port, that is, a port that is simply a notch or a pocket formed in the piston. The secondary air ports 67—68 and 67$^a$—68$^a$, however, are in constant communication with the ends of the cylinder, through axial passages 69 formed in the piston.

The main port 66 is of such length that, in all longitudinal movements of the piston, it is capable of registration with the main cylinder ports 51, 54 and 56, provided it is turned or rotated to the proper position. The secondary ports 67—68 and 67$^a$—68$^a$ are of such length that they are always capable of registration with the co-operating ports 58—59 and 58ª—59ª, providing the cylinder is oscillated to the proper position for effecting such registration. The manner in which these ports co-operate will be further considered later on.

In the top of the cylinder 40 is a large opening, which does not act as a port at any time, but simply affords clearance for a cam pin 70 secured to and projecting radially upward from the piston 65. This cam pin 70 engages with and is adapted to move completely around a so-called cam block 71, shown as depending from a bar 72 rigidly anchored to the upper ends of studs 73 rigidly secured on the top of the cylinder.

Reversely arranged yieldingly held shipper cams or arms 74 are pivotally mounted on the studs or posts 73. The pin-engaging ends of these cam arms 74 are yieldingly pressed toward the beveled ends of the cam lock 71, by coiled torsion springs 75 shown as anchored to the cylinder at their lower ends and to said arms at their upper ends. This gives a very neat, simple and efficient arrangement of said arms and actuating springs. Of course, the piston and cylinder must be kept properly lubricated. Hitherto, in the arrangements provided, there has been a tendency for lubricating oil to work into the can or milk receptacle. To prevent this, I provide a so-called oil trap in the form of a cup 76, the reduced lower end of which is screwed into a seat 77 formed in the central portion of the cam cover 14. The bottom of the seat 77 is formed by a depressed portion of the cover 14, and is provided with a port 78 that is normally closed by a gravity-seated check valve in the form of a ball 79. The oil cup 76 is chambered below its oil-receiving chamber and said lower chamber is in communication with the interior of the base chamber 43 through one or more radial ports 80.

To give better distribution of the lubricating oil, I provide the piston 65 with longitudinally extended grooves filled with oil-absorbing material 81, such as felt. Small oil holes 82, (see Fig. 5), lead from the top of the piston to these absorbent wiper strips or packings 81.

Operation.

Substantially constant partial vacuum will be maintained in the milk pail or receptacle. Hence, there will be a continual suction in the milk tubes 16 and, hence, in the inner or central chambers of the teat cups. This suction on the inner chambers of the teat cups is uninterrupted, while the apparatus is in action, unless, of course, one or the other of the nipples 17 be closed by the valve 19.

In the outer chambers 22 of the teat cups, pressure pulsations will be produced under the action of the pulsator. When the piston 65 of the pulsator is reciprocated, it will be oscillated approximately at the extremities of its reciprocations, under the action of the cam pin 70, which, by cam levers 74, is caused to travel around the cam block 71, all as more fully considered in my prior patent above identified. When the piston 65 is in the position shown in Fig. 5, the nipples 55 will be in communication with the main vacuum nipple 52, so that the teat cup chambers 22 will be subjected to partial vacuum and the flexible walls 21 will then be expanded. When, however, the piston 65 is oscillated by movement of the cam pin 70 to the right hand side of the cam block 71, Fig. 5, then the port 66 will connect the port 54 and, consequently, the nipples 55 to the atmosphere through the port 56, and this, of course, will admit air into the teat cup chambers 22 and cause the flexible walls 21 to be contracted. Thus, the milking action is produced in the teat cups.

As already stated, the port 66 never moves axially of the cylinder out of position for registration with the ports 51, 54 and 56. When the piston 65 is moving from the left toward the right, atmospheric pressure will be admitted in the left-hand end of said cylinder through the ports 58ª, 68ª and 69, at which time the port 59ª is closed. At the same time, however, the atmospheric port 58 will be closed and the suction port 59 will be in registration with the piston port 67, so that partial vacuum will be effected in the right-hand end of the cylinder.

Figure 6:
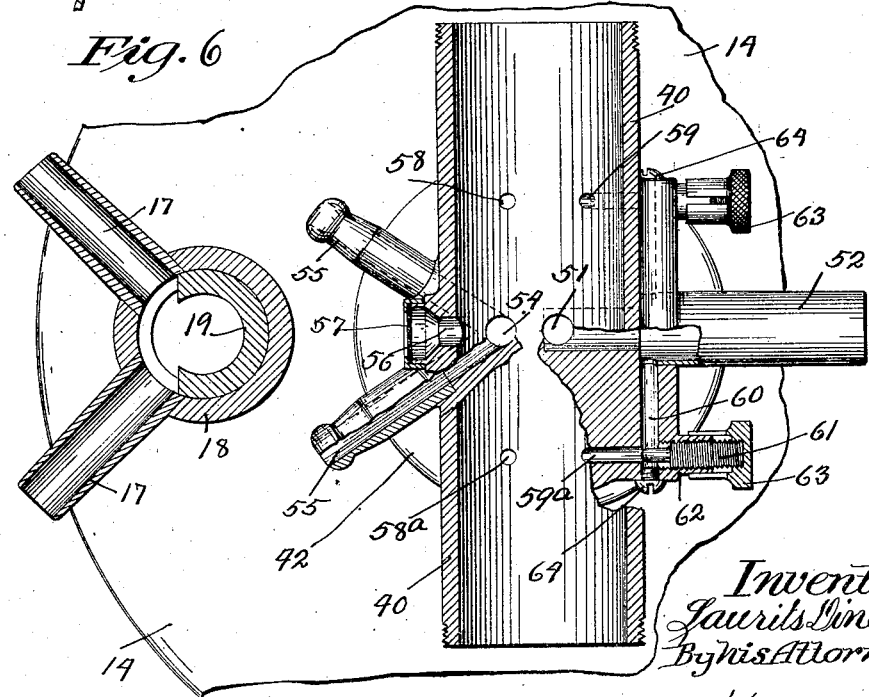
Fig. 6 is a horizontal section taken approximately on the line 6—6 of Fig. 5, some parts being broken away and some parts being removed.

When the piston reaches approximately its extreme position toward the right and its cam pin 70 is moved to the opposite side of the cam block 71 from that shown in Fig. 5, then the suction port 59 and the atmospheric port 58ª will be closed while the atmospheric port 58 and suction port 59ª will be opened. This, of course, admits atmospheric pressure into the right-hand end of the cylinder and subjects the left-hand end of the cylinder and of the piston to suction or partial vacuum; and this, of course, causes the piston to move toward the left. Thus is the piston of the pulsator caused to reciprocate and its combined reciprocatory and oscillatory movements produce or control the pulsations in the teat cups.

Oil for lubricating the piston and cylinder will be delivered thereto through the oil passages 82 and, being absorbed by the pads or packing strips 81, will be held back and delivered slowly and in small quantities to the contacting surfaces of the cylinder and piston. The co-operating ports of the cylinder and piston. being at the bottoms thereof, are located where the greatest wear takes place and where they will be held in close contact by the weight of the piston. Any oil that may accumulate in the bottom of the cylinder will, by suction, be drawn into the port 51 and will run into the oil trap or cup 76 and, hence, will be prevented from getting into the milk can.

The check valve 79 will float or be raised at least part of the time, while the machine is in operation, but will close and prevent air from flowing into the can through the port 78. Air will be drawn from the milk receptacle or pail to maintain the proper partial vacuum therein, through the port 78, passage 80 and port 51 and from thence through the nipple 52 and suction pipe 53 to the vacuum pump or tank.

In Fig. 13, a modified form of oil trap is shown. Here the oil trap is in the form of a chamber 76ª formed in the base 41 of the pulsator, and the bottom of said oil trap is formed by an annular plug having raised air tubes 80ª.

The above described manner of making and assembling the air tube coupler head and milk tube coupler head is highly important. Not only is such construction capable of being easily made but it is highly efficient in action and capable of being quickly taken apart, cleaned and sterilized.

The arrangement of the oil distributing pads or packings in the pulsator piston not only gives the desired slow distribution of oil for a very long period of time, but makes it practical to use a piston that does not tightly fit the cylinder. The arrangement of one longitudinally extended pad or packing on each side of a vertical plane through the axis of the piston, insures even lubrication at both sides of the cylinder and piston.

As a novel feature of the present invention, it will be noted that the suction pipe or tube for maintaining partial vacuum in the milk pail or receptacle is connected to the latter through a conduit in the base of the pulsator and said conduit is provided with a check valve. This check valve, in the preferred arrangement, is seated in the pail cover and access thereto is afforded by removal of the pulsator. As another important novel feature, it will be further noted that, in this improved arrangement, the speed of the piston is controlled by regulation of the vacuum or suction as distinguished from regulation of the atmospheric air supply. This is accomplished by adjustments of the independently movable choke valves 61, and gives a much more certain and reliable regulation.

What I claim is:

1. A pulsator comprising a cylinder and a piston having cooperating ports and means for reciprocating said piston and for oscillating the same at the limits of the piston's reciprocating movements, said pulsator comprising a recessed base that is in communication with certain of the cylinder ports and has a downwardly extended conduit adapting it for connection to the interior of a milk receptacle, certain of the cylinder ports being arranged for connection to teat cups, and a suction pipe connected to the recess of said base.

2. A pulsator comprising a cylinder and a piston having co-operating ports and means for reciprocating said piston and for oscillating the same at the limits of the piston's reciprocating movements, a suction pipe connected to certain of the cylinder ports, said pulsator having a base with a conduit through which said suction pipe is arranged to be connected to the interior of a milk receptacle, and a check valve in said conduit in the base of said pulsator, and certain of the cylinder ports being arranged for connection to teat cups.

3. In a milking apparatus, the combination with a milk receptacle having a cover, of a pulsator comprising a cylinder and a piston having co-operating ports and means for reciprocating said piston and for oscillating the same at the limits of the piston's reciprocating movements, a suction pipe connected to certain of the cylinder ports and certain other cylinder ports being arranged for connection to teat cups, said pulsator having a base detachably connected to said cover and said base having a conduit through which said suction tube is connected to the interior of the pail.

4. In a milking apparatus, the combination with a milk receptacle having a cover, of a pulsator comprising a cylinder and a piston having co-operating ports and means for reciprocating said piston and for oscillating the same at the limits of the piston's reciprocating movements, a suction pipe connected to certain of the cylinder ports and certain other cylinder ports being arranged for connection to teat cups, said pulsator having a base detachably connected to said cover and said base having a conduit through which said suction tube is connected to the interior of the pail, and a check valve in said conduit in the base of said pulsator.

5. A pulsator comprising a cylinder and a piston having co-operating ports and means for reciprocating said piston and for oscillating the same at the limits of the piston's reciprocating movements, a suction pipe connected to certain of the cylinder ports, said pulsator having a base with a conduit through which said suction pipe is arranged to be connected to the interior of a milk receptacle, and certain of the cylinder ports being arranged for connection to teat cups, and an oil trap in the base of said pulsator, said cylinder having a port leading downward thereto.

6. In a milking apparatus, the combination with a milk receptacle having a cover, of a pulsator comprising a cylinder and a piston having co-operating ports and means for reciprocating said piston and for oscillating the same at the limits of the piston's reciprocating movements, a suction pipe connected to certain of the cylinder ports and certain other cylinder ports being arranged for connection to teat cups, said pulsator having a base detachably connected to said cover and said base having a conduit through which said suction tube is connected to the interior of the pail, a check valve in said conduit in the base of said pulsator, and an oil trap in said conduit located above said check valve, said cylinder having an oil port leading downward thereto.

7. In a milking apparatus, the combination with a milk receptacle and a cover therefor, said cover having a port and an upwardly opening check valve co-operating therewith, a cup-like oil trap applied to said cover and overlying said check valve, a pulsator having a base enclosing said oil trap and detachably applied to said cover, and a suction tube having connections for operating said pulsator and having a connection with said milk receptacle through said check valve-equipped port.

8. A pulsator comprising a cylinder and a piston having co-operating ports, certain of which open to the atmosphere and certain of which open to a source of partial vacuum, and check valves applied to the cylinder structure in the ports connected to the source of suction, whereby the speed of the piston may be controlled by the regulation of the action of the suction or partial vacuum thereon.

9. In a milking apparatus, the combination with a milk receptacle having a cover, and a pulsator comprising a cylinder and co-operating piston having co-operating ports, a suction pipe connected to certain of the cylinder ports and provided in such connections with choke valves applied to the cylinder structure in the ports connected to the source of suction for regulating the speed of the piston by variation in suction, certain other of said cylinder ports being arranged for connection to teat cups.

10. A pulsator comprising a cylinder and piston having co-operating ports, a suction pipe connected to certain of the cylinder ports, certain of the cylinder ports being open to the atmosphere and certain other cylinder ports being arranged for connection to a teat cup, the said ports co-operating to produce reciprocations of said piston, means for oscillating said piston at the limit of its reciprocating movements, a pail cover affording a base upon which said cylinder and suction pipe are mounted, and the latter having a port that opens through said cover, said port having an upwardly closing check valve, and an oil trap above said check valve.

11. A pulsator comprising a cylinder and piston having co-operating ports and means for reciprocating said piston and for oscillating the same, a suction tube, said cylinder having three centrally located ports, one connected to said suction tube, another to the atmosphere and the other having teat cup connections, and said piston having a single centrally located port operative by oscillations of the piston to alternately connect said teat cup connected port with said atmosphere port and with said suction port.

12. A cylinder and co-operating piston, said cylinder having an upper oil supply passage and a lower oil discharge passage, and one of said members having an absorbent packing arranged for contact with the other and located between said oil supply and discharge passage.

In testimony whereof I affix my signature.

LAURITS DINESEN.